March 6, 1956

H. R. FREUND 2,737,239

APPARATUS FOR CORRECTION AND MAKE-UP OF
TYPE MATTER FOR PHOTOGRAPHIC PRINTING

Original Filed Jan. 19, 1950

INVENTOR
HERMAN R. FREUND

BY
Curtis, Morris + Safford
ATTORNEYS

March 6, 1956
H. R. FREUND
2,737,239
APPARATUS FOR CORRECTION AND MAKE-UP OF
TYPE MATTER FOR PHOTOGRAPHIC PRINTING
Original Filed Jan. 19, 1950
6 Sheets-Sheet 2
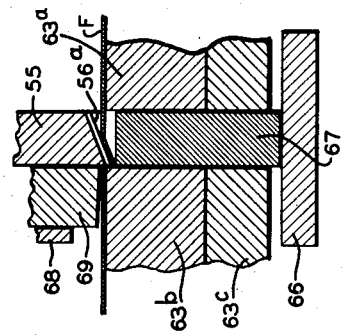
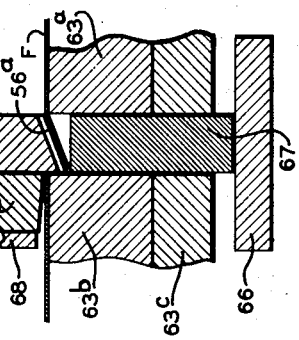
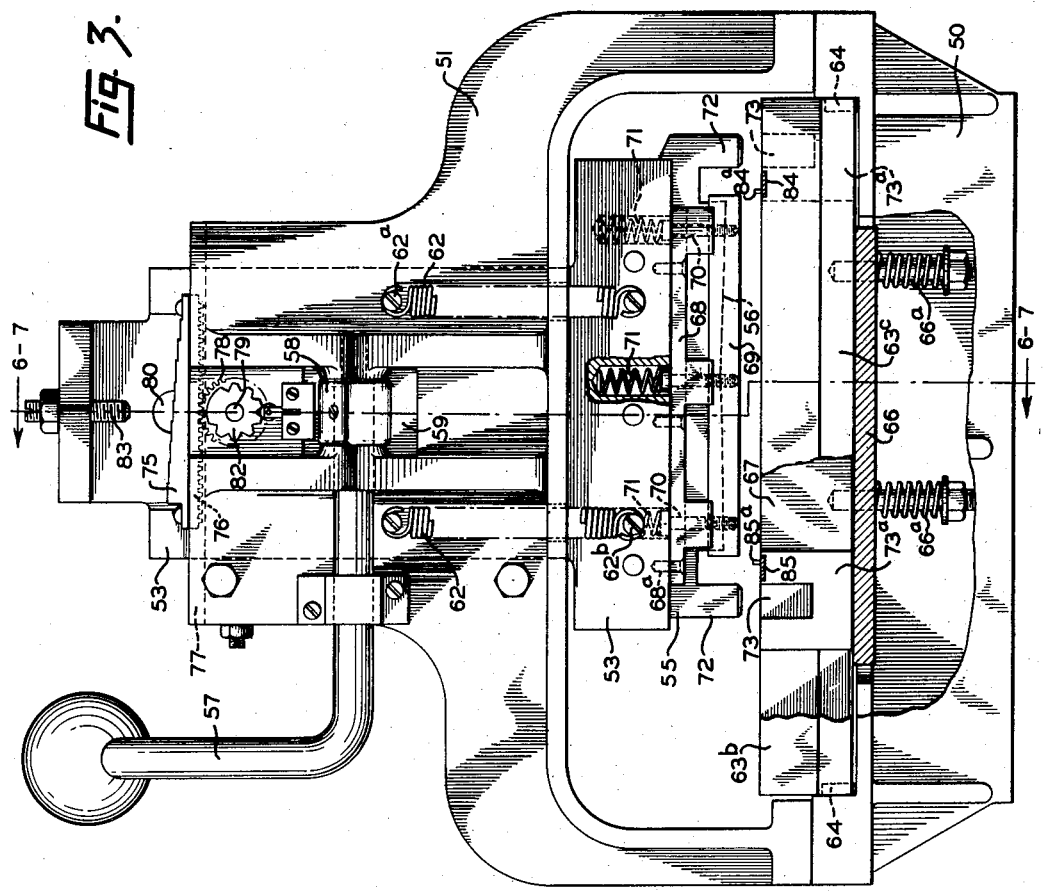
INVENTOR
HERMAN R. FREUND
BY
Curtis, Morris + Safford
ATTORNEYS

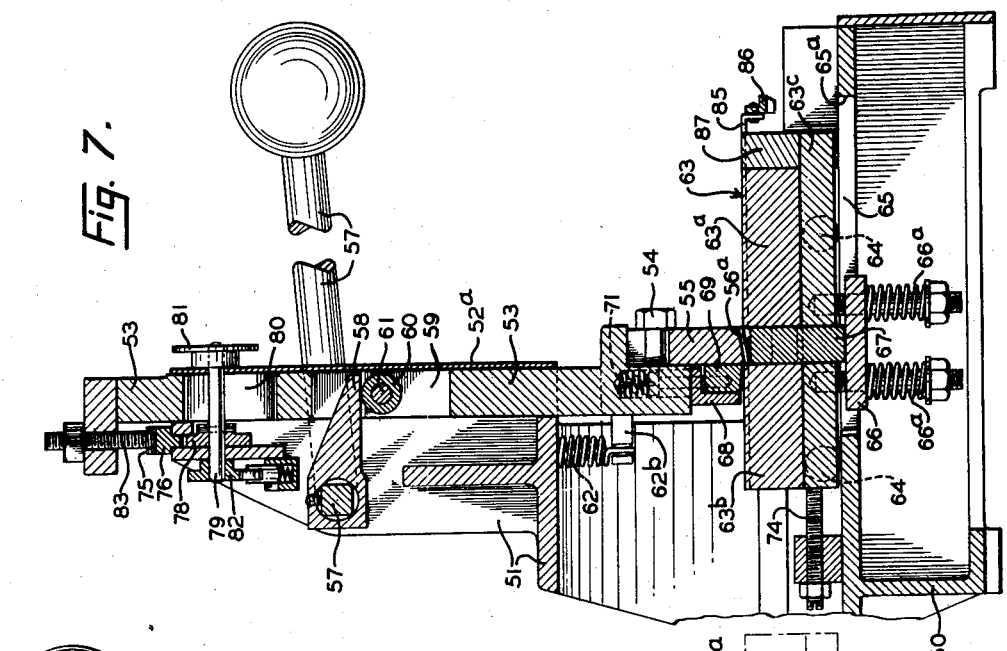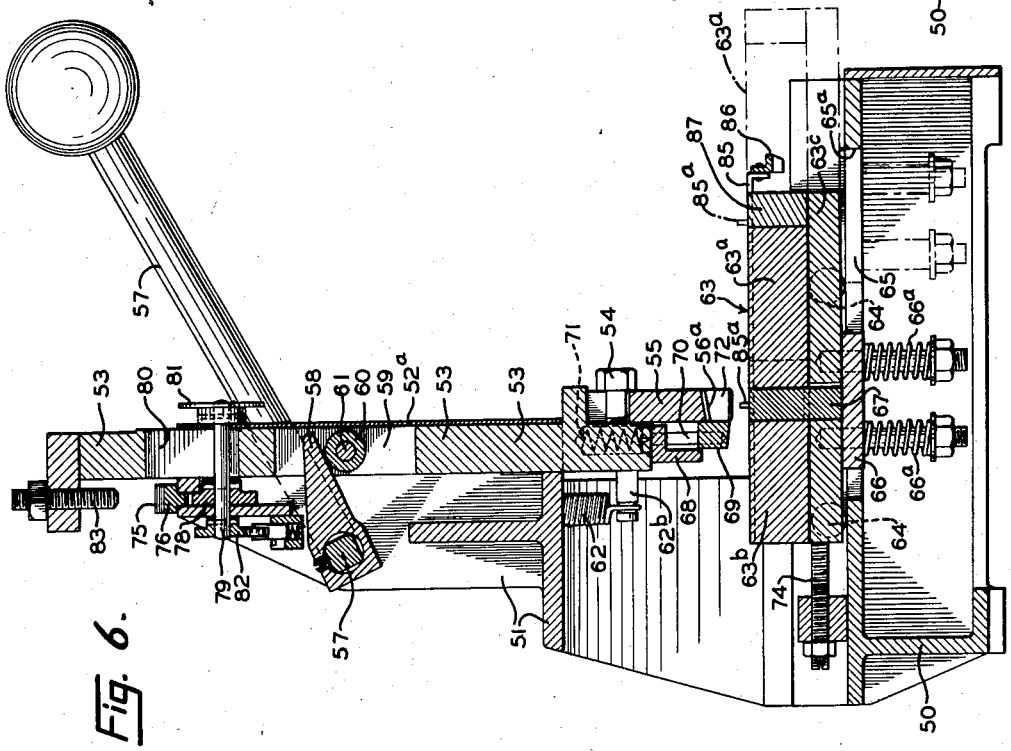

March 6, 1956     H. R. FREUND     2,737,239
APPARATUS FOR CORRECTION AND MAKE-UP OF
TYPE MATTER FOR PHOTOGRAPHIC PRINTING
Original Filed Jan. 19, 1950     6 Sheets-Sheet 4
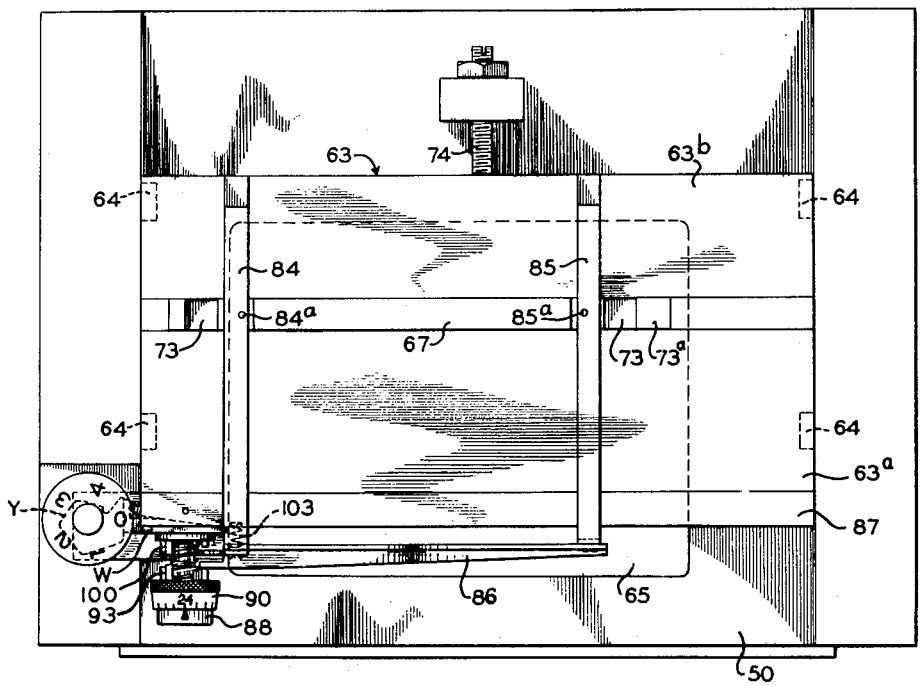
Fig. 8.
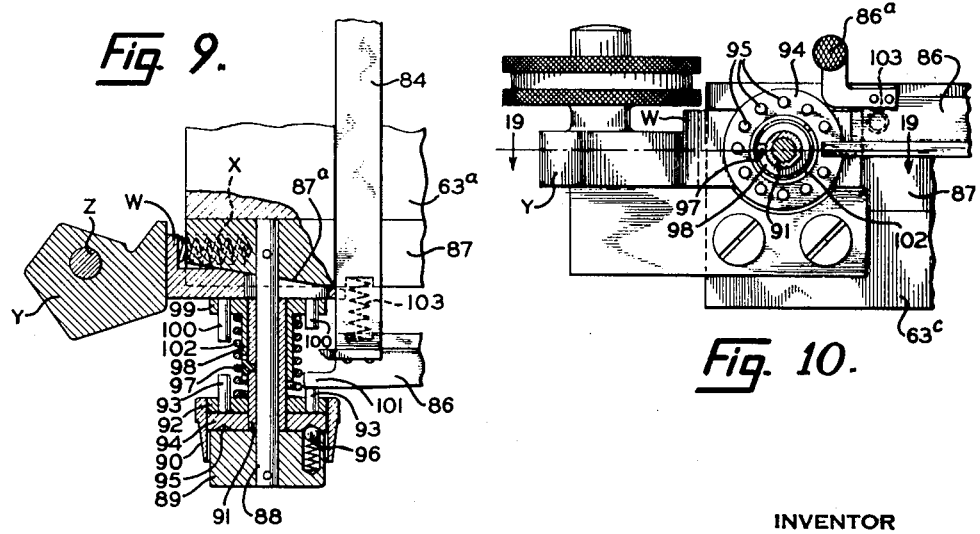
Fig. 9.
Fig. 10.
INVENTOR
HERMAN R. FREUND
BY
Curtis, Morris & Safford
ATTORNEYS

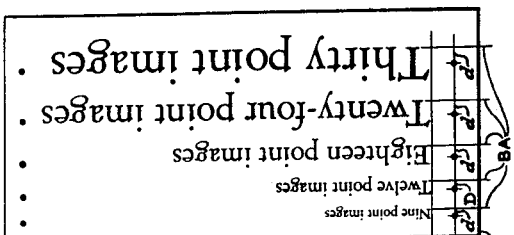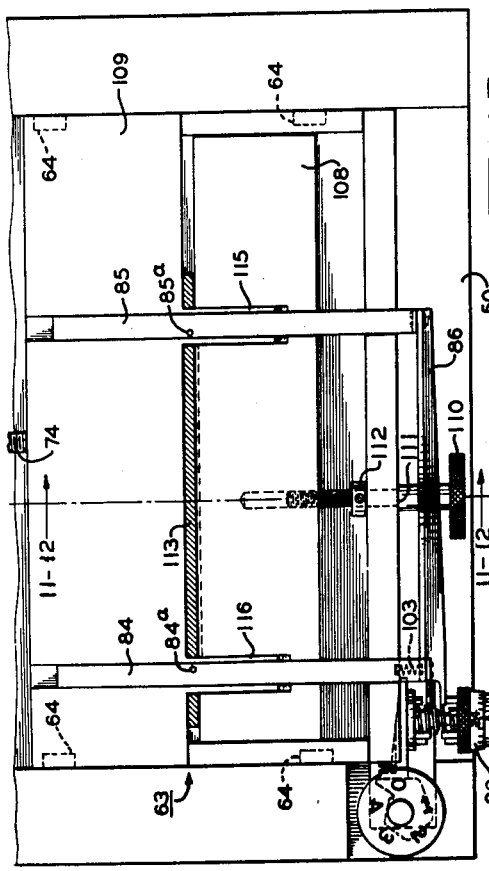

March 6, 1956 H. R. FREUND 2,737,239
APPARATUS FOR CORRECTION AND MAKE-UP OF
TYPE MATTER FOR PHOTOGRAPHIC PRINTING
Original Filed Jan. 19, 1950 6 Sheets-Sheet 6
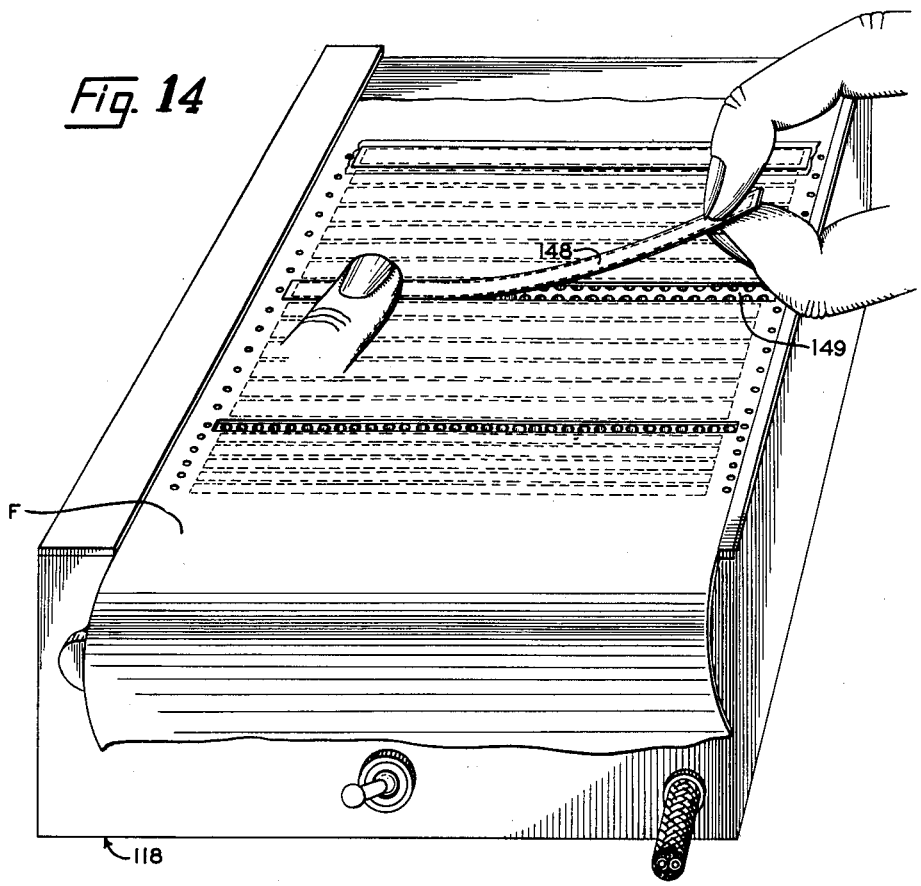
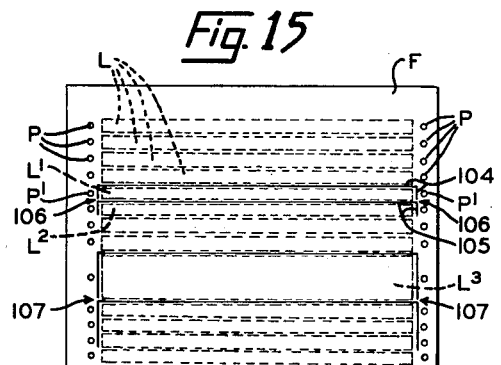
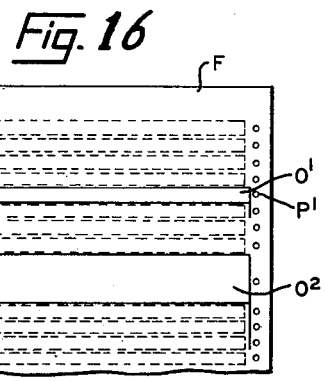
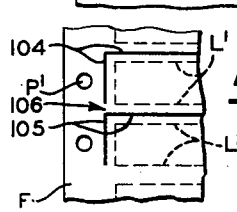
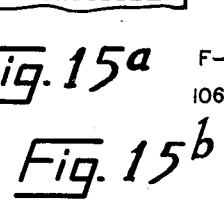
INVENTOR
HERMAN R. FREUND
BY
Curtis, Morris + Safford
ATTORNEYS

United States Patent Office 2,737,239
Patented Mar. 6, 1956

2,737,239

APPARATUS FOR CORRECTION AND MAKE-UP OF TYPE MATTER FOR PHOTOGRAPHIC PRINTING

Herman R. Freund, Brooklyn, N. Y., assignor to Intertype Corporation, Brooklyn, N. Y., a corporation of New York Original application January 19, 1950, Serial No. 139,422. Divided and this application October 20, 1951, Serial No. 252,243

2 Claims. (Cl. 164—86)

This invention relates to the typographical art and more particularly to improvements useful in effecting corrections or alterations in type matter produced on sensitized film or paper, as in a photographic line-composing machine, and in subsequently effecting trimming, relative alignment and stripping together of units or blocks of type matter borne on different pieces of film or paper, thus to provide a composite "make-up" from which to obtain a reproduction proof and finally a planographic printing plate useful in offset and gravure printing processes.

More specifically, the invention relates to improved apparatus and procedure adapted to solve the difficult problem of executing "corrections" and "make-up" with the high degree of accuracy required in relative spacing, parallelism and alignment as between individual lines and columns thereof and between different units or blocks of type when associated together to form a composite sheet or page. According to known proposals for solving corrections and make-up problems, the procedures are not only slow, costly and technically inadequate to deal with type in different point sizes, but are susceptible to such uncontrollable errors as naturally arise from variations in judgment and degree of skill of the worker.

The solution provided by the present invention distinguishes from such prior proposals in that it eliminates the human element from all of the manipulations necessary in effecting corrections and make-up, the required accuracy being attained automatically in respect to type in the full range of type sizes commonly used and the procedures being rapid, flexible and economical throughout.

The present application is a division of my application Serial No. 139,422 filed January 19, 1950, Among the objects of the invention are the following:

To provide a line-strip punch adapted to utilize physical indicia in a "primary" sheet of film or paper to align relative to a shearing knife any faulty line required to be severed out of said "primary" sheet in order to replace it with a substitute corrected line, the latter being severed by the knife from a "secondary" sheet on which such line is produced with similar aligning indicia.

To provide a line-strip punch capable of severing from a sheet bearing lines of composed type matter a portion the dimensions of which may be controlled in accordance with such variables as the point size of the type, etc.

To provide a trimming board adapted to utilize the aforesaid indicia for locating and aligning purposes while cutting off and trimming portions of a sheet squarely and to such size and marginal dimensions as the customary make-up dummy may designate as appropriate for different lines or different blocks of type borne by the sheet.

To provide a make-up plate or table adapted to utilize the aforesaid indicia to relatively locate and align the type matter borne by different trimmed portions of a sheet while assembling and marginally aligning such portions into the composite page form required for the final step of preparing a printing plate.

Other objects are to provide auxiliary facilities such as a vacuum box having a transparent cover illuminated from beneath and useful in effecting rapid and accurate insertion and "stripping in" of corrected or substitute line-strips; a vacuum arrangement in association with the make-up plate or table for holding steady the several trimmed portions of a sheet while manipulating them into exact relative positions and stripping them together, and alternative arrangements for using the aforementioned line-strip punch either to partially or to fully sever faulty and correct line-strips from a sheet, regardless of the point-size of the type and the spacing between successive lines.

The foregoing and other objectives of the invention and the many advantages arising from the practice thereof will be best understood from the detailed description to follow in connection with the accompanying drawings, wherein:

Figure 3 is a rear elevation of the line-strip punch shown in Fig. 1.

Figures 4 and 5 are fragmentary sectional views showing the action of the universal shearing knife on a piece of film upon penetrating the die-bed of the punch to different depths.

Figures 6 and 7 are vertical sections of the line-strip punch taken on the line 6—7 in Fig. 1 or 3: Fig. 6 showing the punch in idle position and Fig. 7 showing the punch in operated position.

Figure 8 is a plan view showing the die-bed of the line-strip punch and parts associated therewith for determining the position relative to the shearing knife of lines in different type sizes.

Figure 9 is a fragmentary view partly in section on the line 9 in Fig. 1, showing in detail the mechanism by which a sheet of film or paper is shifted, between operating strokes of the line-strip punch, to shear above and then below a line of type.

Figure 10 is a fragmentary view in front elevation of the mechanism shown in Fig. 9.

Figures 11 and 12 are fragmentary vertical sections similar to Figs. 6 and 7, but show an alternative embodiment of the line-strip punch wherein exchangeable shearing knives each suited to a different point-size to type are employed and are adapted to completely sever out a line-strip by a single operating stroke of the punch.

Figure 12a is a fragmentary view showing the opening left in a sheet after shearing out line-strip by a knife according to the alternative embodiment of the punch shown in Figs. 11 and 12.

Figure 13 is a plan view similar to Fig. 8, but showing the die-bed of the punch as arranged according to the alternative embodiment of the punch shown in Figs. 11 and 12.

Figure 13a is a diagrammatic view showing the relation of the perforations made in a sheet of film or paper to the line-starting margin and to the base aligning level of lines of type characters reproduced in different type sizes.

Figure 14 is a perspective view of an illuminated vacuum box provided by the invention for facilitating the insertion of corrected line-strips in a sheet of film or paper from which faulty line-strips are severed by the line-strip punch.

Figure 15 is a diagrammatic view showing a sheet bearing a series of lines of type and which has been sheared by the line-strip punch of Figs. 1 to 10 to produce removable strips bearing faulty lines.

Figure 15a is a fragmentary view of a portion of the sheet shown in Fig. 15 and drawn on a greatly enlarged scale, whereby to more clearly show the relation between the cut-lines made in the sheet above, below and at the ends of a line of type by the line-strip punch of Figs. 1 to 10.

Figure 15b is similar to Fig. 15a, but shows outlines such as produced in a sheet when the line-strip punch according to Figs. 1 to 10 is set to compensate for "leaded" line-spacing.

Figure 16 is similar to Fig. 15, but shows the rectangular openings left in a sheet after removal of line-strips sheared by the punch of Figs. 1 to 10.

The apparatus of the present invention is particularly adapted for use in connection with photographic film or paper which has been provided, as described in my aforementioned parent application Serial No. 139,422, with perforations or similar indicia opposite the ends of each composed line of type matter and in predetermined spaced relation to said lines.

According to the invention there is provided a "line-strip" punch which is adapted to utilize these perforations to locate and align, relative to a shearing knife, any faulty lines required to be severed out of a developed original or "primary" sheet of film or paper taken from the film holder 16, whereby to replace such lines with corrected lines severed by the punch from a "secondary" sheet, by utilizing similar perforations made in such sheet for each corrected line prepared thereon in the film holder.

In one of its embodiments, as shown in Figs. 1 to 10, the punch is adapted to produce a removable line-strip in two operating strokes, one to shear above and the other to shear below the type characters in any line to be severed out of a sheet. To this end there is provided a shearing knife which is universal, that is, it may be used to shear from the sheet line-strips bearing type in sizes ranging from 4 to 36 points. For this purpose the bottom face of the knife is tapered upwardly and forwardly from its rear longitudinal cutting edge so that in penetrating the die of the punch the ends of the knife produce lateral cuts of different lengths sheared squarely and forwardly from the cut made by its rear edge. By means of an adjustable gauge which limits the depth to which the knife penetrates the die the lateral end cuts of the knife are made consistent in length with the point size of the type in any line it may be desired to obtain on a sheared-out strip.

In an alternative embodiment, as hereinafter described with reference to Figs. 11 to 13, the punch is adapted to sever out a line-strip in a single operating stroke. To this end the punch is provided with exchangeable knives each of a fixed thickness, such knives being suited alone or in selected pairs to the point-size of the type in any given line.

In both embodiments of the punch the basic structure is substantially the same, the principal difference being in the arrangement of the die-bed and knives.

*The two-stroke punch*

Figure 1:
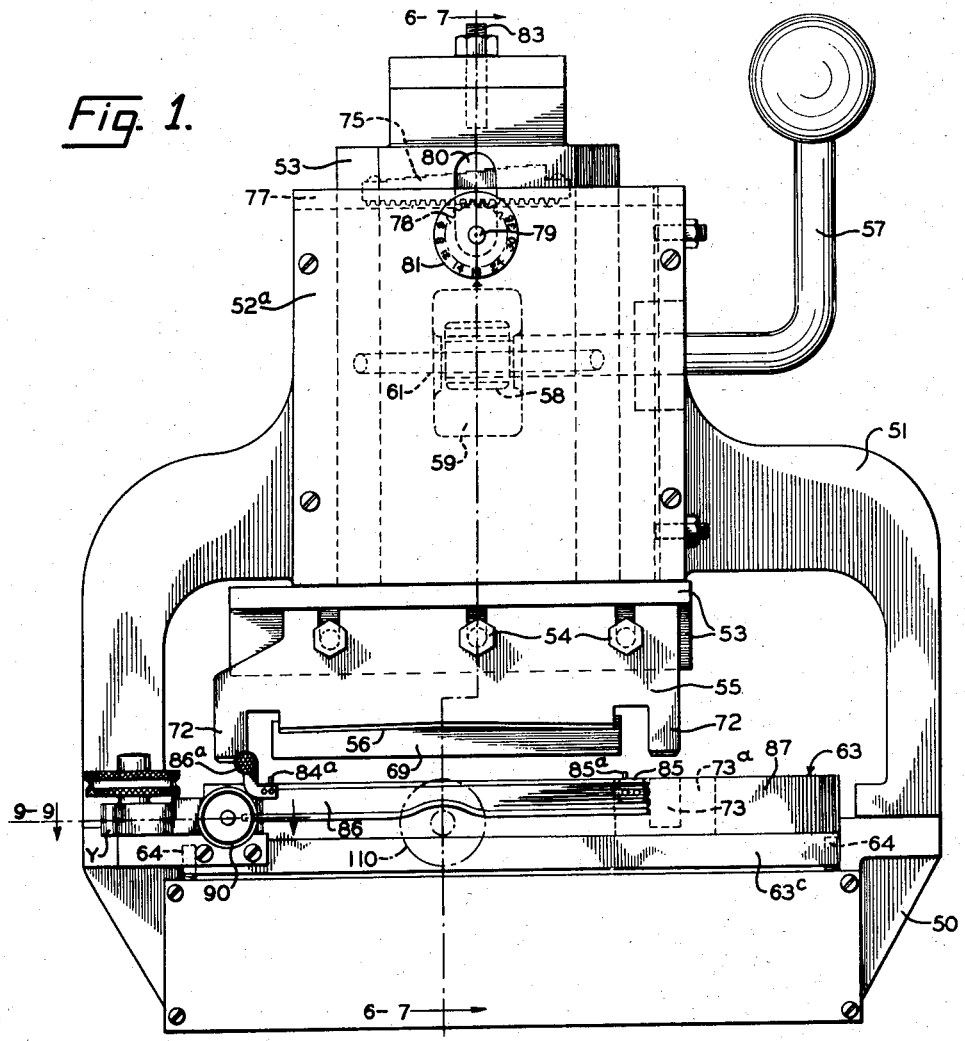
Figure 1 is a front elevation of the line-strip punch of the invention equipped with a universal shearing knife adapted to sever from a sheet of film or paper, in two operating strokes of the punch, line-strips bearing type in different point sizes.
Figure 2:
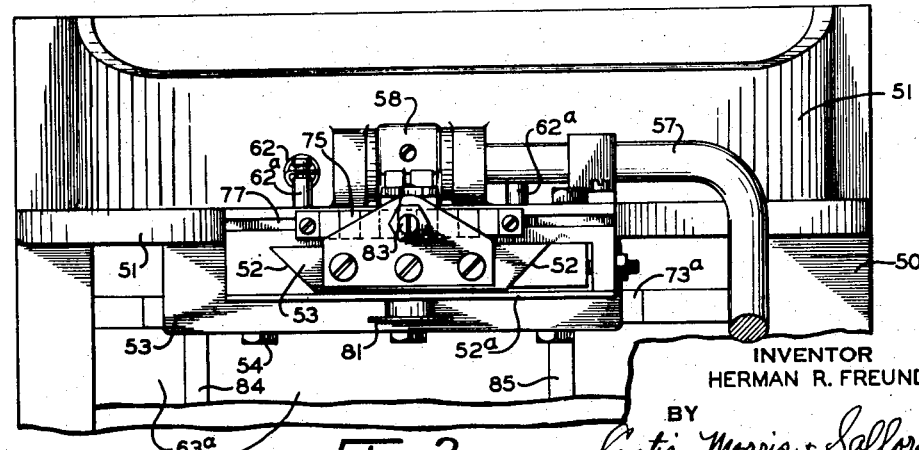
Figure 2 is a fragmentary plan view of the line-strip punch shown in Fig. 1.

Turning first to the two-stroke punch employing the aforesaid universal knife, and with reference to Figs. 1 to 10, it comprises a supporting base 50 to which is secured an upstanding yoke-like frame 51, the latter being provided with dovetail guides 52, Fig. 2, for accommodating a knife holder 53 which is slidable vertically in such guides and is confined by a cover plate 52. Secured to the lower end of the holder 53, as by bolts 54, is the shearing knife 55 the rear longitudinal cutting edge 56 of which is tapered, see Figs. 1 and 3, so as to shear from opposite ends toward the middle. As already stated, the bottom face of the knife is tapered upwardly from its rear cutting edge 56 toward its front edge, whereby upon each operating stroke of the punch the cutting ends 56 of the knife (Figs. 4 to 7) produce lateral cuts sheared squarely and forwardly from the longitudinal cut made by the rear cutting edge.

For operating the punch there is provided an offset hand lever 57 journaled in suitable bearings at the back of the upright frame 51 and having secured thereto an operating arm 58. The arm 58 extends forwardly through an aperture 59 in the knife holder 53 and cooperates with a roller 60 on a shaft 61 which spans the aperture 59. A pair of springs 62 hooked over pins 62ª in the frame 51 and over pins 62ᵇ in the knife holder 53 urge the latter to the inactive or "up" position shown in Figs. 1, 3 and 6. At such position the knife 55 stands clear of the sheet supporting die carriage 63 of the punch, this carriage being provided with roller 64 whereby it may be moved fore and aft on the base 50.

The carriage 63 comprises front and rear die plates 63ª, 63ᵇ which are secured to a bed plate 63ᶜ in such spaced relation as to provide between them an elongated die slot for accommodating the knife 55 when the punch is operated, see Fig. 7. A rectangular opening 65 in the base 50 provides clearance for an elongated plate 66 which underlies the die slot of the carriage and is urged upwardly against the bed plate 63ᶜ by springs 66ª encircling bolts threaded into the bottom of the bed plate. A stripper bar 67 disposed edgewise in the die slot and extending downwardly through a similar cross slot in the bed plate 63 rests on the upper face of the plate 66 with its top edge flush with the top surface of the carriage. The stripper bar 67 corresponds in length and edgewise thickness to that of the knife 55 which latter, when the punch is operated, presses this bar downwardly in the die slot in opposition to the springs 66ª, see Fig. 7. Upon the upstroke of the knife holder 53 after a shearing operation the plate 66 forces the bar 67 upward whereby to push the sheared strip of film upwardly out of the die slot.

Behind the knife 55 there is mounted on the knife holder 53, by means of an elongated angle bracket 68, a vertically movable presser bar 69, the bracket 68 being secured to the holder 53 by screws 68ª, Fig. 3. The bar 69 is supported by bolts 70 which pass through clearance holes in the bracket 68 and are threaded into the bar, the bolts 70 having enlarged heads which are normally pressed downwardly against the upper side of the bracket 68 by springs 71 contained in vertical bores in the underside of the knife holder. The bottom face of the presser bar 69 is slightly beveled, as shown, so that when the punch is operated, see Figs. 4, 5 and 7, the forward edge of the bar adjacent to the rear cutting edge 56 of the knife will yieldingly press and hold a sheet of film F flatwise against the top surface of the carriage during the shearing operation.

To assure accurate alignment of the knife for entry into the die slot of the carriage, the knife is provided beyond its cutting ends with pilot extensions 72 which enter with a neat fit, and in advance of the cutting operation, the apertures 73 formed in U-shaped spacers 73ª secured in the bed plate 63ᶜ and which constitute the opposite ends of the die slot. Forward movement of the carriage 63, to the dotted line position indicated in Fig. 6, is limited by engagement of the plate 66 with the front wall 65ª of the opening 65 in the base 50. Rearward movement of the carriage is limited by the abutment 74 which is adjustable to stop the carriage with the pilots 72 of the knife exactly aligned with the apertures 73.

Adjustable means are provided for regulating the stroke of the punch whereby the depth of penetration of the knife into the die slot will result in lateral cuts made by the ends of the knife which are consistent in length with the point-size of the type on any line-strip to be severed from a sheet. To this end there is provided a stepped gauge 75 having teeth 76 formed on its underside and which is shiftable endwise in a cross channel 77 at the top of the upright frame 51, see Figs. 1, 2 and 3. For setting the gauge 75 there is provided a pinion 78 meshing with the teeth 76 and secured to a fore-and-aft 79, the latter being rotatable in suitable bearings in the frame 51 and the cover plate 52ª and extending forwardly through a vertically elongated aperture 80 in the knife holder 53. Secured to the forward end of the shaft is a dial 81 bearing different point-size markings, and secured to the rear end of this shaft is a notched disk 82 cooperative with a conventional spring-ball detent, whereby through turning the dial 81 the gauge 75 may be shifted endwise and positively located in different adjusted position. A stop screw 83 in a bracket secured to the top of the knife holder 53 limits the stroke of the punch by engagement against such step on the gauge 75 as may be aligned with the screw.

For utilizing the perforations in a sheet of film or paper taken from the film holder 16, whereby to locate and accurately align relative to the shearing knife 55 any line required to be severed out of the sheet, the carriage 63 is provided with two aligning bars 84, 85. These bars carry upstanding pins 84ª, 85ª, respectively, over which with the carriage drawn forward the perforations at opposite ends of any line may readily be engaged, the pins being spaced apart a fixed distance, as determined by the spacing of the perforating punches described in said parent application. The bars 84, 85 are shiftable endwise in guide channels formed in the die plates 63ª, 63ᵇ to a depth such that the bars lie flush with the top surface of the die plates and the pins in the bars project above such surface. At their front ends the bars 84, 85 are rigidly connected to an L-shaped cross-tie 86 having a finger piece 86ª (Figs. 1 and 10) whereby the connected parts may be shifted in unison to the extent necessary, first to align with the knife 55 (with slight clearance) the top of the characters in a line of type of any point-size and then the bottom of the characters in such line. By operating the punch at each such position of alignment there is produced a line-strip which is removable from the sheet by reason of the longitudinal cuts made above and below the line and the lateral cuts simultaneously made by the opposite ends of the knife. Figs. 1, 5 and 15a, to which detailed reference will later be made, illustrate the cuts 104 and 105 made above and below and at the opposite ends of a line L¹, whereby to produce a removable line-strip bearing the type characters of this line which for simplicity is indicated by the dash outline shown within the cut lines.

In order that between operating strokes of the punch the bars 84, 85 may be shifted an extent corresponding to the point size of the type in any line there is provided the mechanism shown to best advantage in Figs. 8, 9 and 10. Thus, in the fixed cross member 87 at the front of the carriage 63 there is secured a forwardly projecting shaft 88 having pinned to its forward end a fixed disk 89. Encircling the disk 89 is a rotatable knurled ring 90 having point-size designations inscribed thereon and registrable selectively with an index mark on the disk 89, see Fig. 8. Secured within the ring 90 and to a sleeve 91 which rotatably bears on the shaft 88 are inner and outer disks 92, 94, the disk 92 carrying a plurality of different length pins 93 projecting inwardly therefrom and the disks 94 having depressions 95 on its outer face which align with the respective pins 93, the depressions 95 being cooperative with a conventional spring-ball detent 96 in the fixed disk 89. Shiftable endwise on the sleeve 91, by means of a slot and pin connection 97, is an outer sleeve 98 having a flanged end 99, the latter carrying a plurality of different length pins 100 projecting forwardly therefrom and similar in number and in length to opposed axial pins 93 in the disk 92.

The length of different pairs of opposed pins in the disk 92 and the flange 99 is such as to present in the path of a tail extension 101 of the cross-tie 86 a gap commensurate with the point-size of the type for which the ring 90 is set. A spring 102 acting against the disk 92 and the flange 99 keeps these parts separated to the maximum extent for each setting of the ring 90. Another spring 103, Fig. 9, serves to urge the cross-tie 86 forwardly to hold its tail extension 101 against the particular pin 93 that stands in its path by virtue of the setting of the ring 90. Thus, assuming a 24-point setting for the ring 90, as indicated in Fig. 8, the gap between the then active pair of opposed pins 93, 100, is such as to allow the cross-tie 86 and in consequence the aligning bars 84, 85, to be shifted in unison from a forward position, after operating the punch to shear above and at the ends of a line of 24-point type, to a rearward position at which to again operate the punch to shear below such line. Such shifting is done manually by pressing inwardly on the finger piece 86ª in opposition to the spring 13 which latter, after the second stroke of the punch, serves to return the aligning bars and the film sheet engaged over the pins therein forwardly until the tail extension 101 again rests against the forward active pin 93.

With further reference to Figs. 8, 9 and 10, means are provided for altering the gap normally existing between an active pair of pins 93, 100, at different settings of the dial 91, thus to enable the bars 84, 85 to be shifted, between operating strokes of the punch, a distance sufficient to sever out line-strips which are wider (in a columnwise direction) than the point-size of the type in any line. The need for this arises by reason of the well known practice of "leading-out" between successive lines in a body of type matter, that is, opening up the space between lines, for better readability, by using in the camera a line-space feed which is greater by one or several points than the point-size of the type. By enabling the bars 84, 85 to be shifted, between the two strokes of the punch, a distance equal to the type size plus the added "leading," and over-setting the stroke of the punch accordingly, there is avoided the chance of leaving between adjacent line-strips that may be severed out, a cross strip of film or paper that is so narrow and fragile (equal in width only to the amount of the "leading") as to be unstable and worthless as a guide inserting a replacement line-strip.

Fig. 15b illustrates how, by oversetting the stroke of the punch to the extent of "leading" between the lines L¹ and L² the lateral end portions of the cuts 104 and 105 are considerably elongated over the showing in Fig. 15a, that is, elongated to a point below the bottom of the type in these lines to the extent of the "leading" or widened space between them.

To enable alteration of th normal gap between an active pair of pins 93—100, whereby to compensate for "leading,"that is, to sever line-strips wide enough to include different amounts of "leading" between lines, there is provided a wedge member W which is shiftable endwise between the flange 99 carrying the pins 100 and the rigid cross member 87 at the front of the carriage 63. A spring X urges the wedge W to the left, as viewed in Fig. 9, against one or another of the radially graduated faces of a manually rotatable vernier cam Y. With the vernier cam Y set at the zero position as indicated in Figs. 8 and 9, the wedge W holds the flange 99 and in consequence the pins 100 therein in normal spaced relation with respect to the pins 93, thus to enable the bars 84, 85 to be shifted only to the extent of the point-size of the type in a line to be severed from a sheet. Should it be desired to sever out a line-strip which is wider than the point-size of the type in a given line by the amount of line-space "leading," it is only necessary to set the vernier cam Y to the 1, 2, 3 or 4-point marking, whichever may apply. As a result the disk 99, under the urge of the spring 102, will respond to leftward movement of the wedge W (by its spring X) and in consequence the gap between the pins 93 and 100 will be such as to enable the bars 84, 85 to be shifted the required distance in excess of the point-size of the type.

*Procedures in using the two-stroke punch*

Two different procedures may be followed in producing removable faulty and correct line-strips with the aid of the foregoing two-stroke punch and universal shearing knife.

According to one procedure line-strips may be severed by the knife 55 so as to be temporarily retained to the sheet by tiny and easily fracturable webs at opposite ends of a severed strip. Such webs are indicated at 106 in Figs. 15 and 15a wherein it will be seen that the lateral portions of the cut 104 made above the faulty line $L^1$ (represented in dash outline) fall short of intersecting the longitudinal cut 105 made below such line, thus leaving the tiny webs 106 by which the severed line-strip is held intact with the film sheet P. As already indicated, the cuts 104 and 105 are made with the perforations $P^1$ opposite the ends of the line $L^1$ engaged over the pins in the aligning bars 84 and 85, the latter being shifted rearwardly between the two strokes of the punch to the extent of the gap between the aligned pair of pins 94, 100 which correspond to the point-size of the type in the line $L^1$.

The retaining webs 106 result from the angle at which the bottom of the universal 36-point knife 55 is tapered, the sharpness of this angle being such that when the stroke of the punch is stopped by the gauge 75 the knife does not penetrate the die sufficiently deep to produce lateral cuts exactly equal in length to the point-size of type designated on the gauge setting dial 81. As will be evident, the angle of the bottom of the knife could be made flatter in order to produce lateral end cuts long enough to completely sever a line-strip from the sheet upon the second stroke of the punch.

However, according to another procedure, the sharply tapered knife 55 may be used to completely sever out a line-strip, that is to produce lateral end cuts long enough to completely detach a strip upon the second stroke of the punch. To accomplish this it is merely necessary to set the dial 81 to a point-size somewhat larger than the type in the line to be severed out (say at the 26-point mark for 24-point type) so that the lateral portions of the cut 104 made on the first stroke of the punch will be long enough to intersect the longitudinal cut 105 made on the second stroke. Obviously the lateral portions of the cut 105 opposite the ends of the line $L^2$ which is not required to be severed out of the sheet serve no useful purpose, yet they do no harm, because when a corrected line-strip severed from a "secondary" sheet is substituted for a faulty strip $L^1$ severed from a "primary" sheet, the useless lateral cuts 105 may be sealed by adhesive tape such as used in the manner later described for securing the substitute corrected line-strip in place in the "primary" sheet.

Either of the foregoing procedures may be followed according to desire or practice in a given shop. One advantage of leaving the severed strips temporarily retained to their respective "primary" and "secondary" sheets is that the sheets may be transported about or accumulated for exchange of faulty strips for corrected strips by a special workman at an assigned place and time, the attached strips then aiding the worker in quickly identifying the complementary strips to be exchanged. If on the other hand the practice should be to identify faulty and corrected lines by a numbering system or the like; or to replace faulty lines with corrected lines sequentially upon detection, the procedure of completely shearing out the faulty and corrected line-strips by over-setting the gauge 75 may be preferred.

The action of the universal 36-point knife 55 and associated parts of the punch under specific settings of the gauge 75 is illustrated in Figs. 4, 5 and 15. Thus, in Fig. 4 where the gauge setting dial 81 may be assumed to be set for 12-point type, the knife has penetrated the 36-point die-opening to the extent that its ends produce lateral cuts just short of 12-points in length and thus leave the tiny webs 106 as seen in Fig. 15. In Fig. 5 where the dial 81 may be assumed to be set for 36-point type, the knife has penetrated the 36-point die-opening to the extent that its ends produce lateral cuts just short of 36-points, thus leaving the tiny webs 107 which retain to the film sheet F the severed 36-point line-strip $L^3$ as seen in Fig. 15. In both instances it will be seen that the presser bar 69 presses the film sheet F firmly down against the rear carriage die-plate $63^b$; that penetration of the knife into the die opening results in downward deflection of the film strip which is being sheared and in depression of the stripper bar 67; that upon withdrawal of the knife out of the die the stripper bar 67 serves to force the deflected strip of film upwardly into its original flat plane with respect to the film sheet. Further, it will be apparent that should the gauge 75 be over-set, whereby to avoid leaving the retaining webs 106 or 107, the stripper bar 67 would then operate to force the completely severed line-strip upwardly into the plane of the film sheet where such severed strip may be readily picked out by the fingers or with the aid of tweezers and discarded.

Fig. 16 shows the opening $O^1$ left in the film sheet F upon removal of the faulty 12-point line-strip $L^1$ of Fig. 15, by breaking the tiny retaining webs 106; also the opening $O^2$ left upon removal of the faulty 36-point line-strip $L^3$ of Fig. 15 by breaking the tiny retaining webs 107. Obviously the openings $O^1$ or $O^2$ would also result if the gauge 75 should be over-set, whereby to eliminate the retaining webs 106 or 107.

*The single stroke punch with exchangeable knives*

Figs. 11, 12 and 13 illustrate the alternative arrangement of the punch wherein faulty and corrected strips may be completely severed from a "primary" or a "secondary" sheet by a single operating stroke. To this end the punch is equipped with exchangeable knives which alone or in selected pairs correspond in thickness (plus a slight excess to just clear the top and bottom of the type characters) to the point-size of the type in a line to be severed out, and the stroke-limiting gauge 75 is set to permit full penetration of both edges and the ends of the knife through the sheet and the die-slot upon a single stroke of the punch.

To accommodate such knives the carriage 63 is provided, as seen in Figs. 11, 12 and 13, with a front die plate 108 which is adjustable fore and aft relative to the fixed rear die plate 109, whereby to provide a die slot suited to knives differing in thickness and which may be selectively attached to the knife holder 53. An adjusting screw 110 threaded about centrally into the front edge of the die plate 108 is provided with a shoulder 111 and a collar 112 bearing against the opposite faces of the rigid cross member 87, whereby upon turning the screw the die plate 108 may be shifted fore and aft on the bed plate 108, the stripper bar 67 formerly provided between the front and rear die plates is, of course, omitted.

To adjust the die plate 108 relative to an attached knife, the knife holder is momentarliy lowered, as in Fig. 11, thus to position the knife between the front and rear die plates while turning the adjusting screw 110 until, in the manner of operating a micrometer, the operator "feels" the setting. Fig. 11 shows the die plate 108 adjusted forwardly to provide clearance for attaching a desired knife, and Fig. 12 shows this die plate shifted inward into engagement with the attached knife 113.

Further in respect to this embodiment of the punch, it will be apparent that since the selected shearing knife (or pair of knives) is exactly suited to the point-size of the type in a line to be severed out and is always allowed to fully penetrate the die in a single stroke of the punch, there is no need for shifting the aligning bars 84, 85 over the pins of which are engaged the perforations opposite the ends of the line-strip to be removed. It is only necessary that the dial 91 be initially set to the point-size of the type in the line to be sheared out, whereupon the spring 103 acting on the cross tie 86 will position the bars 84, 85 in correspondence with the active pin 93. As a result, the top and bottom of the characters in such line are concurrently aligned with the front and rear cutting edges respectively of the knife. Fig. 12a illustrates the clean-cut opening V left in the film sheet F after a single shearing operation by the knife 113 completely severs out the line-strip. With this embodiment of the punch a line-strip wider than the point-size of the type by the amount of "leading" between lines may be severed out simply by using knives which alone or in selected pairs are sufficiently thick to account for the amount of "leading."

As seen in Figs. 11 and 12, a drawer 114 is provided in the base 50 of the punch for receiving the severed-out line-strips, and the inner face of the front die plate 108 is cut back as at 108ª to widen the die slot, thus to permit the strips to drop freely into the drawer. Further, as seen in Fig. 13, the rear die plate 109 is formed with forwardly extending portions 115, 116 which neatly fit into complementary slots formed in the adjustable die plate 108, thus providing for accurate guidance of the latter and also of the aligning bars 84, 85 which are embedded in the extended portions 115, 116. A stop pin 117 limits forward movement of the carriage 63, whereby to position the latter for convenient placement of the perforations in a film sheet over the pins in the bars 84, 85, and the adjustable stop 74 limits rearward movement of the carriage to the point where the rear cutting edge of the knife 113 aligns with the front edge of the fixed die plate 109.

In connection with the openings O¹, O², and V left in a sheet after removal of line-strips severed out by the punch in either of its embodiments, it will be observed that such openings terminate short of the perforations in the marginal edges of the sheet, thus leaving the sheet intact and also preserving the perforations for use as register means in performing subsequent trimming and make-up operations such as hereinafter described.

From the foregoing description it will be evident that for each faulty line severed out of an original or "primary" sheet by utilizing the perforations made therein while the sheet is in the film holder 16, there is prepared on a "secondary" sheet a substitute corrected line with similar perforations which are used to sever such line from this sheet. Also, it will be evident that faulty and corrected lines are severed from their respective sheets by operating the line-strip punch, in either of its embodiments, at the same time settings in respect to the point-size of the type in the corresponding lines. Therefore each corrected line-strip will be of the exact size of the opening left in the "primary" sheet after removal therefrom of the corresponding faulty line-strip. Accordingly, the longitudinal and lateral end walls of the opening left in the "primary" sheet by removal of the faulty line-strip provide physical abutments against which the corresponding edges of the substitute corrected line-strip may be accurately positioned, whereby to assure perfect vertical and horizontal alignment of the type in the substitute line with the type in adjacent unaltered lines on the sheet undergoing correction.

As an aid in executing corrections, that is, placing corrected line-strips into the openings in a "primary" sheet where faulty line-strips have been removed, the compositor may use an illuminated vacuum box as illustrated at 118 in Fig. 14, and as described in my aforesaid parent application. Upon registering the inserted corrected strip 148 in the opening 149 the strip may be secured to the film sheet, as by applying small tabs of transparent, pressure-sensitive tape crosswise at the opposite ends or an overlying longitudinal strip of such tape, illustrated in Fig. 14, being careful only to avoid covering the perforations. It will be understood that in subsequent steps performed prior to producing a printing plate bearing the type matter on this corrected sheet, any "ghost-lines" which might result from the edges of the adhesive tabs or strips either disappear or are eliminated, according to different known procedures which may be followed.

I claim as my invention:

1. A line-strip shear adapted for use in correcting lines of type characters which have been photographically enlarged in various ratios to different point sizes so as to extend different distances both above and below the respective longitudinal axes of said lines, said lines being borne on a sheet of film or paper having perforations therein at the opposite ends of each of said lines and in predetermined parallel relation to said axes, said shear comprising, in combination, a vertically reciprocable knife holder for removably holding one knife of a set of knives of a length slightly exceeding the length of said lines and of different thicknesses in accordance with the point sizes of the type in said lines, a sheet supporting carriage having an upper surface lying in a single plane, a fixed transversely extending cutting edge and a pair of cutting edges each extending at right angles from one end of said transversely extending cutting edge, the latter two cutting edges being spaced apart a distance equal to the width of said knife and all of said cutting edges lying in said plane, a supporting member having an upper surface and a cutting edge lying in said plane, said cutting edge extending parallel to the longitudinally extending cutting edge on said carriage and extending substantially the full distance between said latter two cutting edges on said carriage to define a rectangular opening for receiving said knife, said member being movable relative to said carriage to vary the size of said opening in accordance with the thickness of said knife, a pair of pin supporting slides supported by said carriage at opposite ends of said opening for sliding movement transversely of said opening, a pair of sheet locating pins projecting upwardly from said pin supporting slides, said pins being spaced apart the same distance as the rows of perforations in said sheet and the line through said pins extending parallel to the longitudinally extending cutting edge on said carriage, whereby the two perforations at opposite ends of a line on one of such sheets may be placed on said pins to align the longitudinal axis of said line parallel to the axis of said opening, a single control member mechanically linked to both of said pin supporting slides for simultaneous and equal movement thereof independently of the movement of said supporting member whereby to shift the longitudinal axis of said line relative to said opening to a position in accordance with the vertical distance which the characters of said line extend from said axis.

2. A shear as claimed in claim 1 wherein said single control member has associated with it indicia graduated in accordance with the ratio of enlargement of said type characters.

References Cited in the file of this patent

UNITED STATES PATENTS

| | | |
|---|---|---|
| 606,261 | Yates | June 28, 1898 |
| 1,331,563 | Genter | Feb. 24, 1920 |
| 1,698,333 | Howell | Jan. 8, 1929 |
| 1,928,383 | Lee et al. | Sept. 26, 1933 |
| 2,564,156 | Eden | Aug. 14, 1951 |